(12) United States Patent
Wood et al.

(10) Patent No.: US 8,131,269 B2
(45) Date of Patent: Mar. 6, 2012

(54) VOICE MESSAGE DELIVERY SYSTEM AND METHOD

(75) Inventors: Howard A. Wood, Santa Cruz, CA (US); Benjamin P. Hencke, Santa Cruz, CA (US); Nickolas R. Heckman, Santa Cruz, CA (US); Gretel J. Baumgartner, Santa Cruz, CA (US)

(73) Assignee: Reliance Communications, Inc., Santa Cruz, CA (US)

( * ) Notice: Subject to any disclaimer, the term of this patent is extended or adjusted under 35 U.S.C. 154(b) by 434 days.

(21) Appl. No.: 12/512,959

(22) Filed: Jul. 30, 2009

(65) Prior Publication Data

US 2011/0028127 A1 Feb. 3, 2011

(51) Int. Cl.
*H04M 11/10* (2006.01)

(52) U.S. Cl. ........ 455/413; 455/416; 455/417; 709/206; 709/207; 370/260; 379/88.23; 379/88.26

(58) Field of Classification Search ................. 455/416, 455/417, 413; 709/206, 207; 370/260; 379/88.23, 379/88.26, 209.1
See application file for complete search history.

(56) References Cited

U.S. PATENT DOCUMENTS

| 8,059,793 B2 * | 11/2011 | Shaffer et al. | 379/88.13 |
| 2010/0042690 A1 * | 2/2010 | Wall | 709/206 |
| 2011/0131287 A1 * | 6/2011 | Skakkebaek et al. | 709/206 |

* cited by examiner

*Primary Examiner* — Kamran Afshar
*Assistant Examiner* — Manpreet Matharu
(74) *Attorney, Agent, or Firm* — Gard & Kaslow LLP

(57) ABSTRACT

A hosted system receives a request for the delivery of a voice message from a collective such as a school district. The hosted system determines whether the message should be sent over a telephone line at the hosted system or the school district. Instructions are sent to a delivery mechanism at the determined location indicating how to prepare the message and the number to be called. In one embodiment, the instructions are in XML script form to reduce the bandwidth required. Having the hosted system determine the allocation of messages allows for both the efficient use and lower calling cost of any available capacity on telephone lines at a school district or other collective organization, as well as the larger capacity access to telephone lines of a hosted service for quick delivery of numerous or urgent messages.

18 Claims, 8 Drawing Sheets

VOICE MESSAGE DELIVERY SYSTEM AND METHOD

FIELD OF THE INVENTION

The present invention relates generally to the creation of voice messages and their delivery by telephone. More specifically, the invention relates to a method and apparatus for allocating the delivery of a large number of voice messages among a plurality of available resources and for economically distributing the information required to create and send the messages to the respective resources.

BACKGROUND OF THE INVENTION

In many situations it is desirable or necessary for an institution or organization to contact one or more members of a group of people that are affiliated with the institution or organization. One common example of this is a school; in some cases, the school may wish to contact the parents of one or more students for a specific reason, such as an unexplained absence, while in other cases the school may wish to contact the parents of all of the students to make a general announcement about a school event or news that affects all students.

Unlike some "robo-dialers" that dial numbers sequentially until someone answers, in a case of the type contemplated herein there is a specific telephone number or set of numbers to be called, each corresponding for example to the household of a student. To avoid the necessity for making all of these calls manually, various systems have been devised to make such calls to specific numbers automatically and play a desired message when any dialed number is answered, as well as to keep track of which numbers have been reached and which should be retried.

In a first type or "generation" of such a system, a single computer at a school is programmed with the numbers to be called, and connected to one or more telephone lines. FIG. 1 illustrates this type of system. A plurality of schools or other institutions 102 are shown. Each school 102 has its own computer 104, and each computer 104 has access to one or more telephone lines 106. One or more messages are recorded; each message is associated with one or more of the numbers programmed into the computer, and the computer is programmed to call each number and to play the associated message when and if the call is answered.

It will be apparent that such a system has a number of inherent drawbacks. Each institution or organization must have its own computer capable of being programmed to make such telephone calls, and its own telephone lines. In addition, in such a system each school must also have a sufficient number of telephone lines to allow any desired calls to be made in a reasonable period of time at any time of day. For example, if a call is desired to be made during school hours, it will be appreciated that not all of the telephone lines available to the school should be used to make calls to deliver voice messages, as this will leave the school without telephone access for other business during that time.

On the other hand, using less than all of the telephone lines available to the organization means that fewer telephone lines will be available for the voice messages. If a school has a thousand or more students, a not uncommon number, it can be seen that the number of telephone lines that is made available for delivery of a voice message to all student households will have a significant impact on how long it takes to deliver the message to all households. If the information is time-sensitive, using fewer telephone lines may result in an undesirable delay in delivering the message.

A second generation system such as that shown in FIG. 2 is intended to address some of these issues. In FIG. 2 a plurality of institutions 202, such as schools, are organized into a plurality of collectives 204, such as school districts. While each school 202 typically has a computer 206, this is not strictly necessary. Each school district 204 has a computer or server 208 which is programmed to make telephone calls to deliver recorded messages, as well as a plurality of telephone lines 210. Voice messages are not sent directly by the schools 202 to the desired recipients, but rather message requests and the intended recipients are sent to the school district 204 in which the school 202 is located, and the computer or server 208 then dials the appropriate numbers and delivers the voice messages.

A system of the type shown in FIG. 2 allows the school districts 204 to obtain some advantages of scale. Now each school 202 does not need to have a computer or telephone lines capable of making all of the calls that the institution may wish to make, but need merely be capable of transmitting requests to the corresponding school district 204. Instead, school district 204 typically has more resources, i.e., a faster and perhaps more capable computer or server and more telephone lines, than any individual school 202 would have in a system such as that shown in FIG. 1. Thus, if an individual school 202 makes a request to send a voice message to a large number of recipients, the school district 204 of which the school 202 is a part will be expected to be able to deliver the message faster, in the absence of other pending requests, than the school 202 would be able to on its own.

However, the system of FIG. 2 still has some of the drawbacks of the system of FIG. 1. While the school district 204 may have greater capability than any individual school 202, that capability is still not unlimited and in fact may be considerably less than the combined capability that all of the schools 202 in a district 204 would have if each school used a system of the type shown in FIG. 1. Thus, while calls on behalf of a single school 202 may be made faster by the school district 204 when there are no other pending, requests, if all of the schools 202 in a district 204 make requests at about the same time the system of FIG. 2 may actually be slower than multiple systems of the type shown in FIG. 1. There may still be a limit on available resources, i.e., a "bottleneck," but now at the level of the school district 204 rather than at each individual school 202.

A third generation system is shown in FIG. 3. In this type of system, both the individual schools 302 (or other institutions) and the school districts 304 (or other collectives) to which they belong are directly connected to, and send their requests for delivery of voice messages to, a hosted system 306 which accesses telephone lines 308. Hosted system 306 is typically much larger than the district computer or server 208 in FIG. 2 and has a much larger number of available telephone lines, and thus can service a much larger number of schools 302 and districts 304 without undue delays in the delivery of the voice messages.

Using systems of the type shown in FIG. 3 was a fundamental shift in mass voice message notification. However, the downside of such systems is an increased telecommunications cost. Systems of the type shown in FIGS. 1 and 2 use the same telephone lines that already exist in schools and school districts (or other institutions or collectives), and the calls will almost always be free local calls as students typically reside within a certain distance from the school they attend. The system of FIG. 3, on the other hand, requires a completely separate set of telephone lines 308 that must be paid for, and does not use any of the capacity of the existing telephone lines in schools 302 or school districts 304.

In addition, the system of FIG. 3 requires independent hardware and does not use any capability of any computers located in either the schools 302 or school districts 304.

A variation of the system of FIG. 3 is shown in FIG. 4, and attempts to combine some of the elements of the second generation system of FIG. 2 with those of the system of FIG. 3. In this system, the schools 402 again connect to their respective school districts 404, which in turn connect to a hosted system 406. School districts 404 have access to telephone lines 408, while the hosted system 406 has access to telephone lines 410.

In the system of FIG. 4, the school districts 404 are able to make calls directly to deliver voice messages and do so if there is capacity on telephone lines 408. If that capacity is exceeded, i.e., if there are too many calls for a district 404 to make within a desired time information about other desired calls is pushed to hosted system 406, which makes those calls on telephone lines 410. In this fashion, the available capacity of telephone lines 408 of school districts 404 is utilized first to make calls that are presumably local and toll-free, before using telephone lines 410 of hosted system 406, which may require toll calling. This system also allows calls to be pushed to hosted system 406 if there is some other problem that prevents school district 404 from making calls.

However, even the system of FIG. 4 has some drawbacks. There is not, and generally cannot be, any real sharing of information between school districts 404 and hosted system 406, since they typically use systems from different vendors and thus typically communicate only through an API (application programming interface). Rather, the data needed to deliver the messages resides at the school districts 404, and it is only the data needed to satisfy specific requests for messages that is sent to a hosted system 406. If a school district 404 loses the data or the ability to transmit it to hosted system 406, for example due to corruption of the data, or a power or network outage, none of the schools 402 in that district 404 will be able to send any voice messages, thus potentially preventing messages from being sent when they are most needed.

Further, it has thus far been difficult for a hosted system 406 to deliver information back to school districts 404 due to the asynchronous nature of most $3^{rd}$ party APIs; there may also be issues with firewalls, as school districts 404 (and other collectives) are often very protective of access to the confidential information of their member schools 402 or other institutions.

Another issue is the generation of the voice messages for delivery. In some prior voice message delivery systems, the message is a recorded live voice. If a single identical message is to be sent to a large number of recipients, this is not a difficult or labor-intensive process. On the other hand, if there are a large number of different messages, each of which is to be sent to a single recipient or a small number of recipients, the recording of such messages can be very time consuming. For this reason, some prior art systems have used text to speech (TTS) software, which allows a computer to synthesize speech from a text entry, which is then used for the voice message. This generally reduces the time necessary to create the messages.

However, whether a message is recorded from a live voice or created by TTS software, there is also an issue as to where the voice message is created, specifically whether it is created in the same location from which the call to deliver it will be made. First, if a message is created at the school or district level, the computer or system there must have the capability to create and handle audio files and may need TTS software as well. Further, audio files such as .wav files, or even compressed audio files such as .mp3 files can be large and thus require substantial transmission time. Thus, creating an audio file at the school or district level and transmitting that file to the district or to a hosted system can create both bandwidth requirements and additional delay in delivering the message.

While prior art systems are able to deliver voice messages to large numbers of recipients, as discussed all of them have certain drawbacks. It is desirable to be able to create and deliver large numbers of individualized voice messages in an efficient yet economic fashion without such drawbacks.

SUMMARY OF THE INVENTION

In an embodiment of the present invention a hosted system receives a request for the delivery of a voice message from a collective such as a school district. The request defines the desired message and indicates its intended recipient(s). The hosted system contains the data necessary to prepare and deliver the desired voice message to the indicated recipients, and logic to determine whether the message should be delivered by the hosted system or the school district, instructions are sent to a delivery mechanism at the hosted system or the school district as determined indicating what message is to be delivered and the number to be called. In one embodiment, the instructions are in XML script form.

In one embodiment a method for calling a telephone number to deliver a voice message on behalf of one of a plurality of requestors organized into groups, each group having a group delivery mechanism with the ability to make telephone calls and play voice messages, comprises receiving at a central system a request from a requestor to deliver a voice message to a designated telephone number, the central system having a central delivery mechanism with the ability to make telephone calls and play voice messages, determining whether the message should be delivered by the central delivery mechanism or by the group delivery mechanism of the group to which the requestor belongs, transmitting instructions to the central delivery mechanism if it is determined that the message should be delivered by the central delivery mechanism, or to the group delivery mechanism if it is determined that the message should be delivered by the group delivery mechanism, the instructions indicating the voice message to be delivered and the telephone number to which it is to be delivered, and calling the designated telephone number from the delivery mechanism that receives the instructions and playing the indicated voice message if the call is answered.

In another embodiment, a method for calling telephone numbers to deliver voice messages on behalf of a plurality of requestors organized into groups, each group having a group delivery mechanism with the ability to make telephone calls and play voice messages, comprises receiving at a central system a plurality of requests from senders to deliver indicated voice messages to designated telephone numbers, the central system having a central delivery mechanism with the ability to make telephone calls, selecting a first plurality of messages to be delivered by the central delivery mechanism and a second plurality of messages to be delivered by the group delivery mechanism of a group for requestors within that group, transmitting a first plurality of instructions to the central delivery mechanism to deliver the first plurality of calls, and a second plurality of instructions to the group delivery mechanism to deliver the second plurality of calls, each instruction indicating a voice message to be delivered and the telephone number to which it is to be delivered, calling each number in the first plurality of instructions from the central delivery mechanism and playing the message indicated for that number if the call is answered, and calling each number in the second plurality of instructions from the group delivery mechanism and playing the message indicated for that number if the call is answered.

In still another embodiment, a hosted system for delivering a voice message on behalf of one of a plurality of requestors organized into groups, each group having, the ability to make telephone calls and play voice messages, comprises a processor and a central delivery mechanism having the ability to execute instructions to make a telephone call and play a voice message, the processor configured to receive from a requestor a request to deliver a voice message to a designated telephone number, create instructions indicating the voice message to be delivered and the telephone number to be called, determine whether the message should be delivered by the central delivery mechanism or by the group to which the requestor belongs, and transmit the instructions to the central delivery mechanism if it is determined that the message should be delivered by the central delivery mechanism, and to the group if is determined that the message should be delivered by the group.

In yet another embodiment, a system for delivering voice messages on behalf of a plurality of requestors organized into groups comprises a server and a group delivery mechanism at the group, the server containing a central delivery mechanism and a processor. The central delivery mechanism includes a telephone module for making telephone calls and a voice rendering module for executing instructions to prepare a voice message and for playing the voice message, and the processor is configured to receive from a requestor a request to deliver a voice message to a designated telephone number, create instructions indicating the voice message to be delivered and the telephone number to be called, determine whether the message should be delivered, by the central delivery mechanism or by the group to which the requestor belongs, and transmit the instructions to the central delivery mechanism if it is determined that the message should be delivered by the central delivery mechanism, and to the group if it is determined that the message should be delivered by the group to which the sender belongs. The group delivery mechanism includes a telephone module for making telephone calls and a voice rendering module for executing the instructions, preparing a voice message and playing the voice message.

DETAILED DESCRIPTION OF THE INVENTION

In the present invention, institutions and collectives, such as schools and school districts, send their requests for the delivery of voice messages to a central hosted system. Each request defines a desired message and indicates its intended recipient(s). The hosted system contains data necessary to prepare the voice messages and deliver them to the indicated recipients, and logic that allocates the delivery of messages between the hosted system and the school districts. Once the hosted system has determined a particular message should be delivered by the hosted system or a school district, instructions are sent to a delivery mechanism at the hosted system or school district as determined indicating what message is to be delivered and the number to be called. In one embodiment, the instructions are in XML script form.

Having the hosted system determine which system should deliver the message allows for both the efficient use and lower calling cost of available capacity on telephone lines at a school district or other collective organization, as well as access to the larger capacity of telephone lines at a hosted service for quick delivery of numerous or urgent messages. Further, having the data necessary to prepare the requested voice messages reside at the hosted system allows for reduced bandwidth for the transmission of requests, as well as uniformity of the messages. Use of the XML script for instructions reduces the bandwidth necessary to send the instructions to a delivery mechanism at the selected location.

Figure 1:
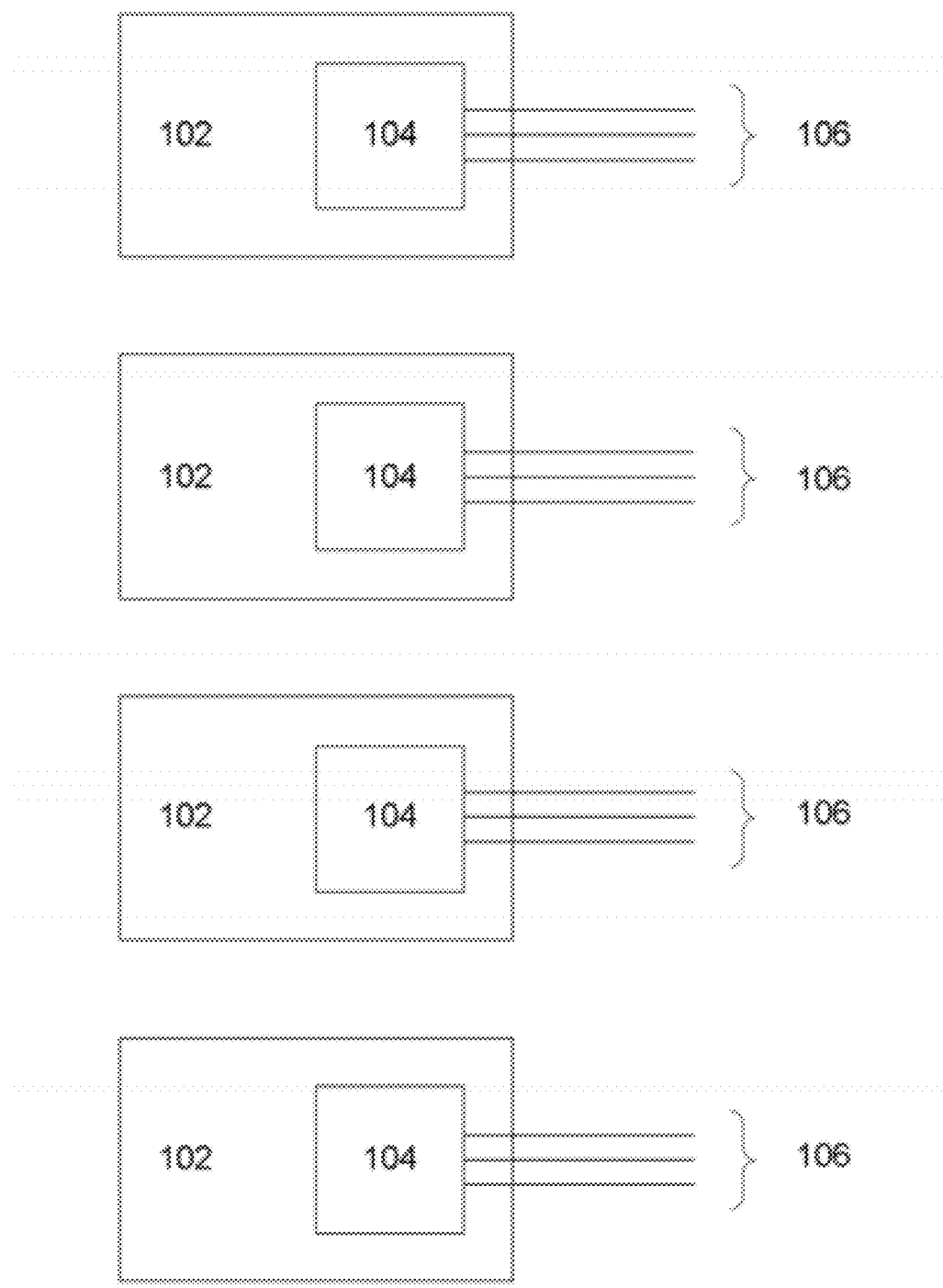
FIG. 1 illustrates one type of voice message delivery system of the prior art.
Figure 2:
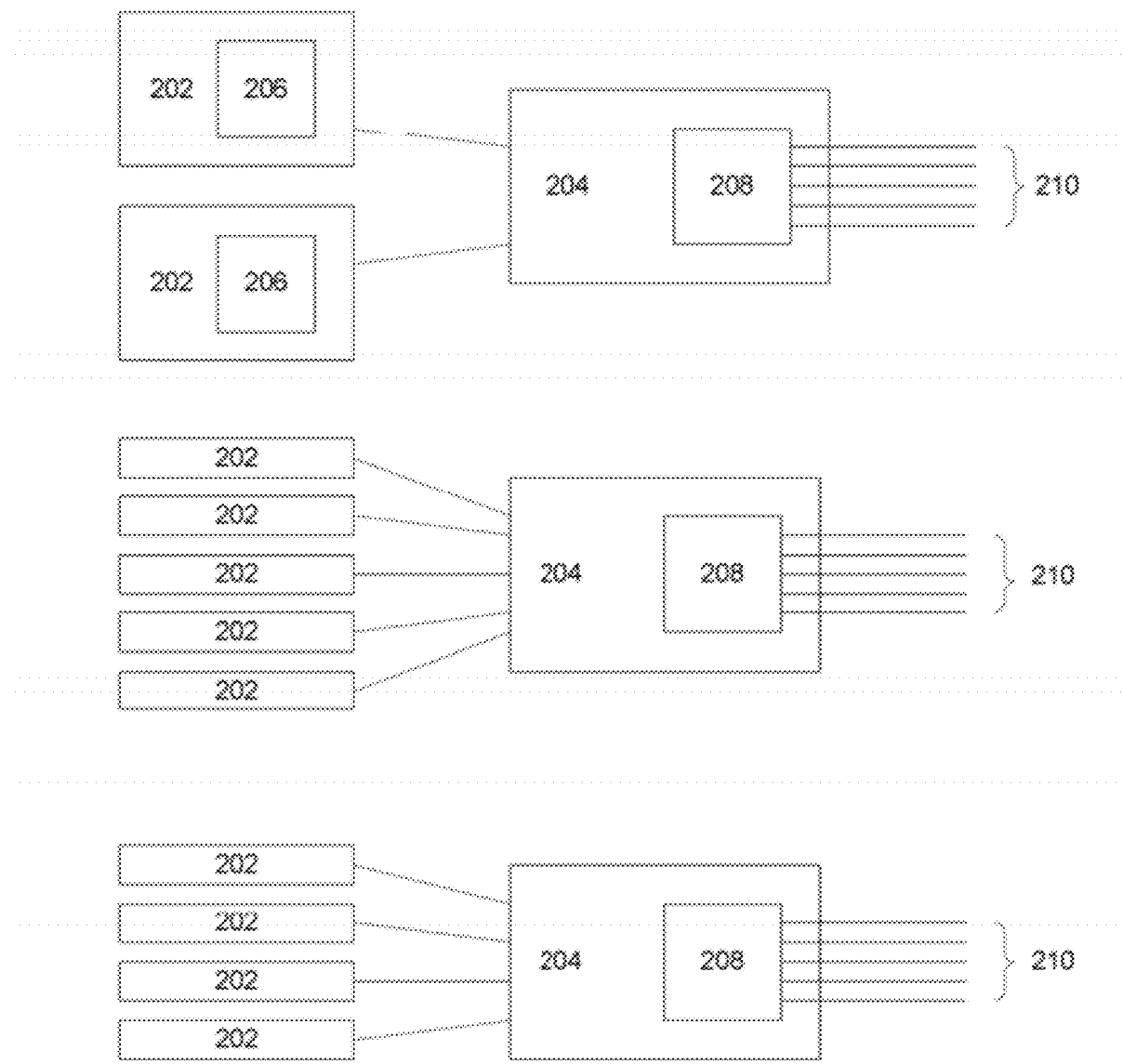
FIG. 2 is an illustration of another type of voice message delivery system of the prior art.
Figure 3:
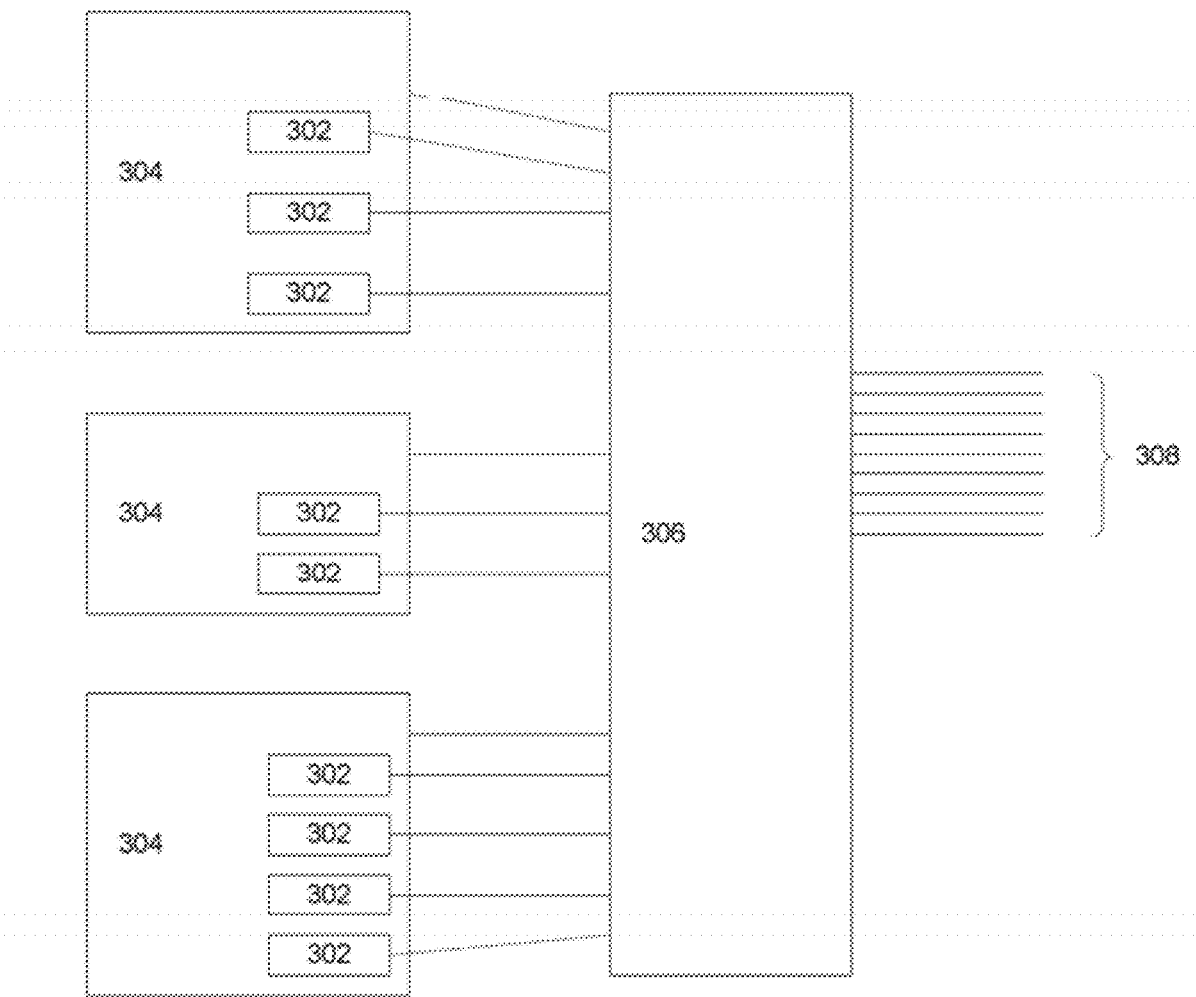
FIG. 3 illustrates another type of voice message delivery system of the prior art.
Figure 4:
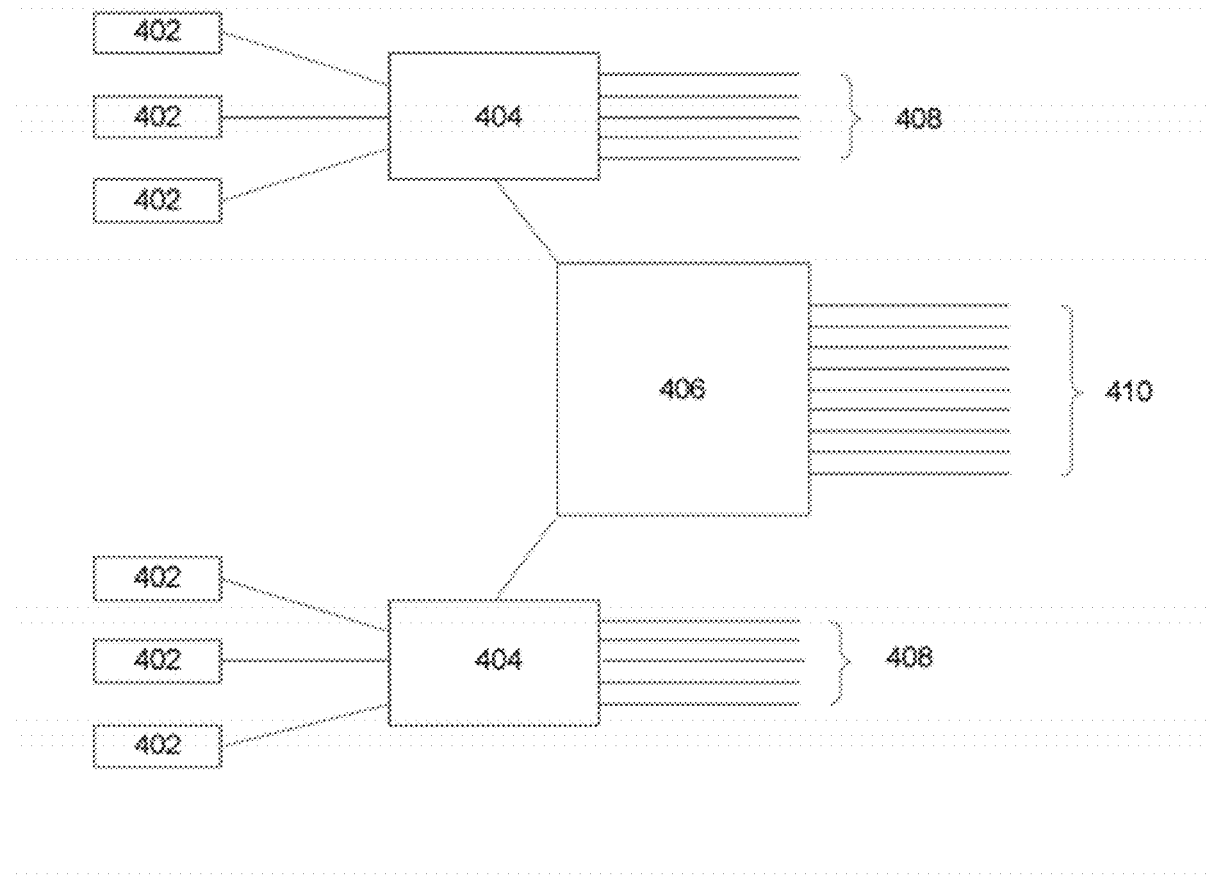
FIG. 4 illustrates another type of voice message delivery system of the prior art.
Figure 5:
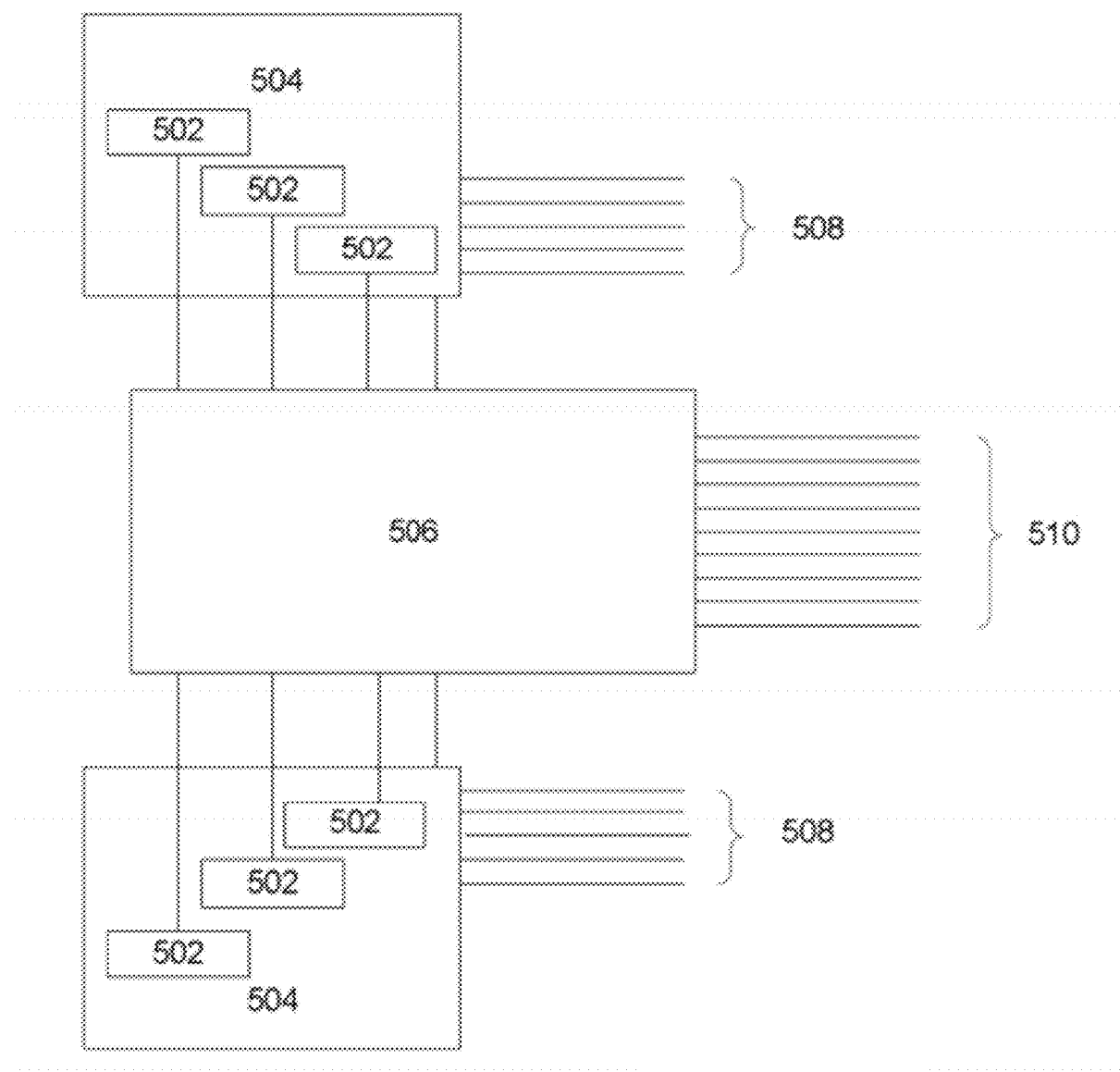
FIG. 5 is an illustration of one embodiment of a voice message delivery system according to the present invention.

FIG. 5 shows one embodiment of a voice message delivery system according to the present invention. A plurality of schools 502 and school districts 504 are directly connected to a hosted system 506. School districts 504 have access to telephone lines 508 and are able to use these lines to deliver voice messages and do so under certain circumstances as described herein. Hosted system 506 similarly has access to telephone lines 510 for the delivery of voice messages. As with the other hosted systems described above, hosted system 506 will typically have access to a large number of telephone lines. While schools 502 will have access to telephone lines (not shown) for their normal operation, those lines are not used to send voice messages in this embodiment.

The schools 502 and school districts 504 that use hosted system 506 send their requests for delivery of voice messages directly to hosted system 506; each request defines the desired content and recipient(s) of a message. As is known in the art, a message may be intended to be personalized and directed to a single recipient, or intended for a particular group of households or for all households of students in a particular school 502 or school district 504. It is also possible for hosted system 506 to distinguish between a live recipient and an answering machine, and deliver a different message for each if desired.

Hosted system 506 has the information necessary to prepare and deliver the requested voice messages to the desired recipients. In the present example of schools and school districts, a database in hosted system 506 may contain, for example, the names of all students in schools 502, their school districts 504, their grade level, the telephone numbers of their respective households, and/or any other information that may be necessary or useful in identifying which households should receive which messages.

Hosted system 506 also contains data, hardware and/or software for preparing the voice messages. This may typically include a database of prerecorded messages or portions of messages, text-to-speech (TTS) capability for generating a voice message from text, or other ways of preparing voice messages for delivery. When a request is received from a school 502 or school district 504, the appropriate message is prepared for delivery, in the manner discussed further below.

School districts 504 each have one or more client delivery mechanisms for performing the functions described herein.

The client delivery mechanism may be hardware or software or a combination thereof, for example a computer or server, or other commercially available device such as a Cisco Application eXtension Platform (AXP), which allows the running of Linux applications on a Cisco Integrated Services Router (ISR), and on which software is installed. If the client delivery mechanism located at a school district is not already busy and thus available to deliver a message, it "polls" hosted system 506 indicating its availability and asking if there have been requests to send messages to telephone numbers in that district that have not yet been met and that are deemed appropriate for the district to deliver.

As above, the hosted system 506 has the required information to prepare messages in response to requests that may be made by schools 502 and school districts 504. Hosted system 506 also contains scheduling logic that is able to determine how to efficiently schedule the requested calls on the telephone lines 510 of hosted system 506 and to track those messages sent to school districts 504 for delivery based upon the polling from the client delivery mechanisms in the districts 504.

Based upon desired parameters, for each message that is requested to be delivered to a telephone number within a school district 504, the scheduling logic of hosted system 506 determines whether the message should be delivered by hosted system 506 or by the school district 504 if possible. If it is determined that the message should be delivered by hosted system 506, the message is prepared and the call is made on a telephone fine 510 as described below. If the message is determined to be appropriate to be delivered by the school district 504, the scheduling logic checks to see whether it has been polled indicating an availability of the client delivery mechanism at school district 504 to deliver a message.

If hosted system 506 has been polled by a school district 504 and the scheduling logic has determined that a message to a telephone number in that district should be delivered by the district, hosted system 506 will send instructions to the client delivery mechanism in that district 504 regarding a voice message that is to be delivered. The instructions indicate the telephone number to be called and what message is to be delivered if the call is answered, as further explained below. If the scheduling logic has determined that a message to a telephone number in that district should be delivered by the district but the hosted system 506 has not been polled by the client delivery mechanism in school district 504 in which the telephone number is located, then hosted system 506 will prepare the message and make the call on a telephone line 510.

Typically, for the reasons discussed above the school districts 504 will not be expected to send critical or time sensitive messages, and so the messages that are delivered by the school districts 504 will generally be those that do not need to be delivered quickly and do not relate to emergency issues with the more important messages being delivered by hosted system 506. However, messages may be divided between hosted system 506 and school districts 504 for any desired reason.

In this fashion, the available capacity of telephone lines 508 of school districts 504 is utilized to deliver some of the requested messages, while telephone lines 510 of hosted system 506 are used to deliver the rest of the requested messages. Also, this may allow the number of telephone lines 510 of hosted system 506 to be reduced by some amount.

However, in contrast to the systems of the prior art described above, in the present invention the control over which messages are delivered by hosted system 506 and which are delivered by school districts 504, and the information needed to prepare and deliver the messages, resides in the hosted system 506 rather than at a school 502 or school district 504 level. Hosted system 506 is also likely to be more robust and capable than a system at a school 502 or school district 504, typically having more telephone lines, redundant servers and power systems, etc. Thus, it is less likely that data will be lost, or that there will be an inability to deliver the requested messages due to a loss of power or other emergency.

Figure 6:
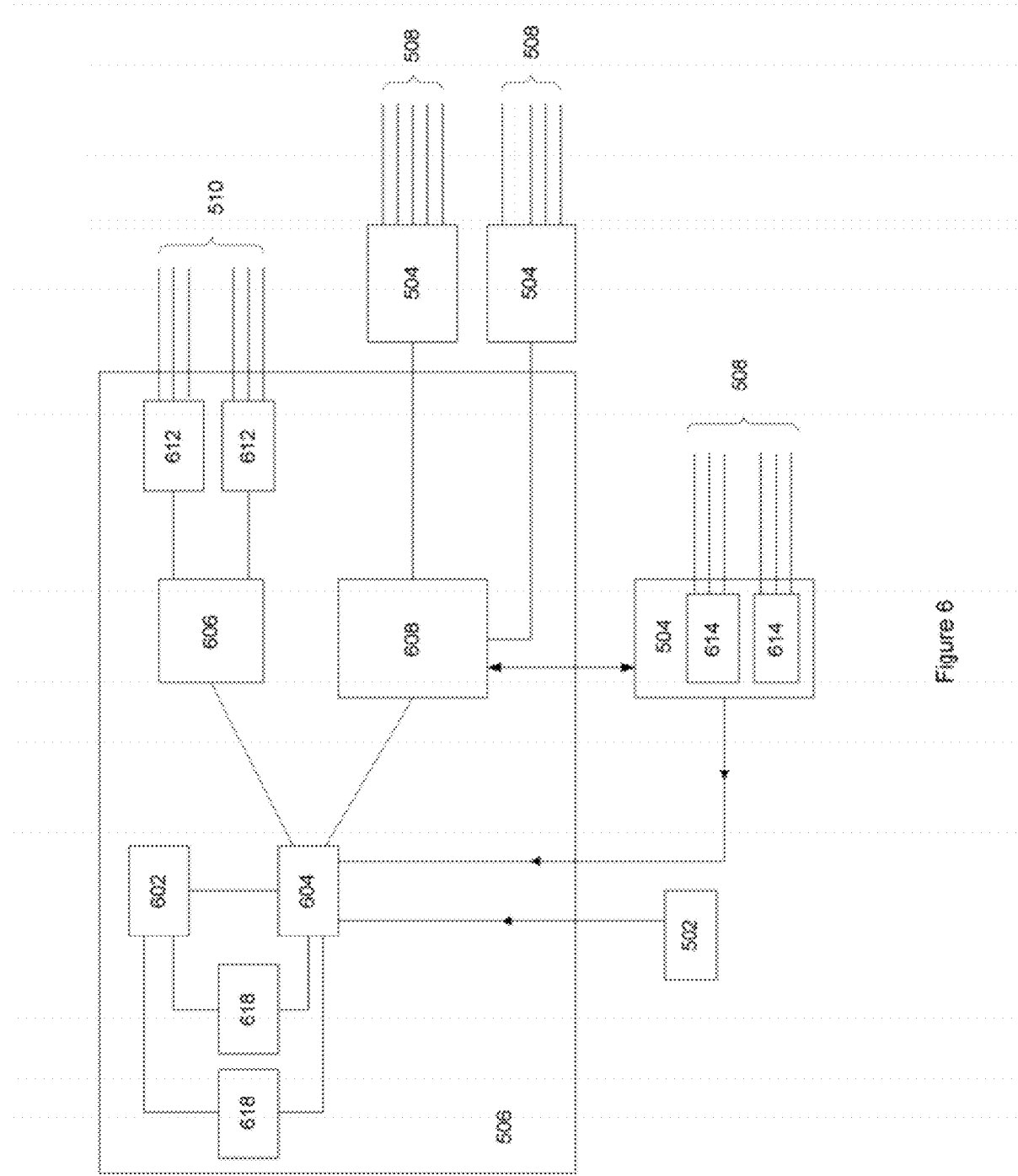
FIG. 6 shows a more detailed view of an embodiment of a voice message delivery system according, to the present invention.

FIG. 6 shows a more detailed view of one embodiment of a hosted system 506 and the client delivery mechanism(s) 614 at a school district 504. As above, a database 602 in hosted system 506 contains the necessary information to prepare and deliver voice messages. Logic 604 receives requests from schools 502 and/or school districts 504 to deliver messages, and polling information from the client delivery mechanism(s) 614 indicating their availability to deliver messages. (For simplicity only one school 502 is shown in FIG. 6, but as described above a hosted system 506 will typically support a plurality of school districts 504, each school district 504 containing a plurality of schools 502.) A text to speech (TTS) module 616 allows for the conversion of received text into speech for use in voice messages as described below.

When a request to deliver a message is received from a school district 504, or a school 502 within that school district 504, logic 604 accesses database 602 to locate the information needed to prepare and deliver the requested message. As above, logic 604 also determines whether the message should be delivered by hosted system 506 or by the school district 504. Again, the decision of whether a message is preferably delivered by hosted system 506 or by a school district 504 may be made based upon any desired criteria, including, but not limited to, importance, the need for prompt delivery, the availability of telephone lines at the corresponding school district 504, or any other factor that is considered relevant.

If logic 604 determines that a message should be delivered by hosted system 506, it sends instructions regarding which telephone number to call and what message is to be delivered, including the location of the needed information in database 602, to a system dispatcher 606. System dispatcher 606 is connected to and monitors a plurality of system delivery mechanisms 612 which poll system dispatcher 606 when they are available to deliver messages and are each connected to one or more of the telephone lines 510 of hosted system 506.

System dispatcher 606 forwards the instructions to a system delivery mechanism 612 that has indicated the ability to deliver a message. System delivery mechanism 612 prepares the desired voice message as described below, accesses an available telephone line 510 and makes a call to the indicated telephone number and, if the call is answered, plays the resulting voice message. Upon either the successful completion or failure of the call, system delivery mechanism 612 reports the result back to system dispatcher 606, which forwards the result to logic 604, which then records the result in database 602. System delivery mechanism 612 may then poll system dispatcher 606 again if it is available to deliver another message.

As above, each school district 504 has one or more client delivery mechanisms 614 which communicate with hosted system 506 to inform logic 604 when a client delivery mechanism 614 is available to deliver a message. Each client delivery mechanism 614 located in a school district 504 is similar to the system delivery mechanisms 612 but located in a school district 504 rather than in hosted system 506. However, a system delivery mechanism 612 receives instructions from system dispatcher 606, while a customer delivery mechanism 614 receives instructions from the public dispatcher 608 in hosted system 506, prepares a voice message based on those instructions, and accesses a telephone line of the district to make a call and deliver the voice message.

Thus, where as above instructions are sent to a system delivery mechanism if logic 604 determines that a message should be sent by hosted system 506, in the instance that logic 604 determines that a message should be delivered by a school district 504 it checks to see if a client delivery mechanism 614 in that school district 504 has polled indicating that it is available to deliver a message. If a client delivery mechanism 614 has polled indicating such availability, logic 604 sends instructions to public dispatcher 608, which communicates with the client delivery mechanisms 614 located in school districts 504, rather than to system dispatcher 606, indicating which telephone number to call and which message to deliver. Public dispatcher 608 forwards the instructions to an appropriate client delivery mechanism 614.

Figure 7:
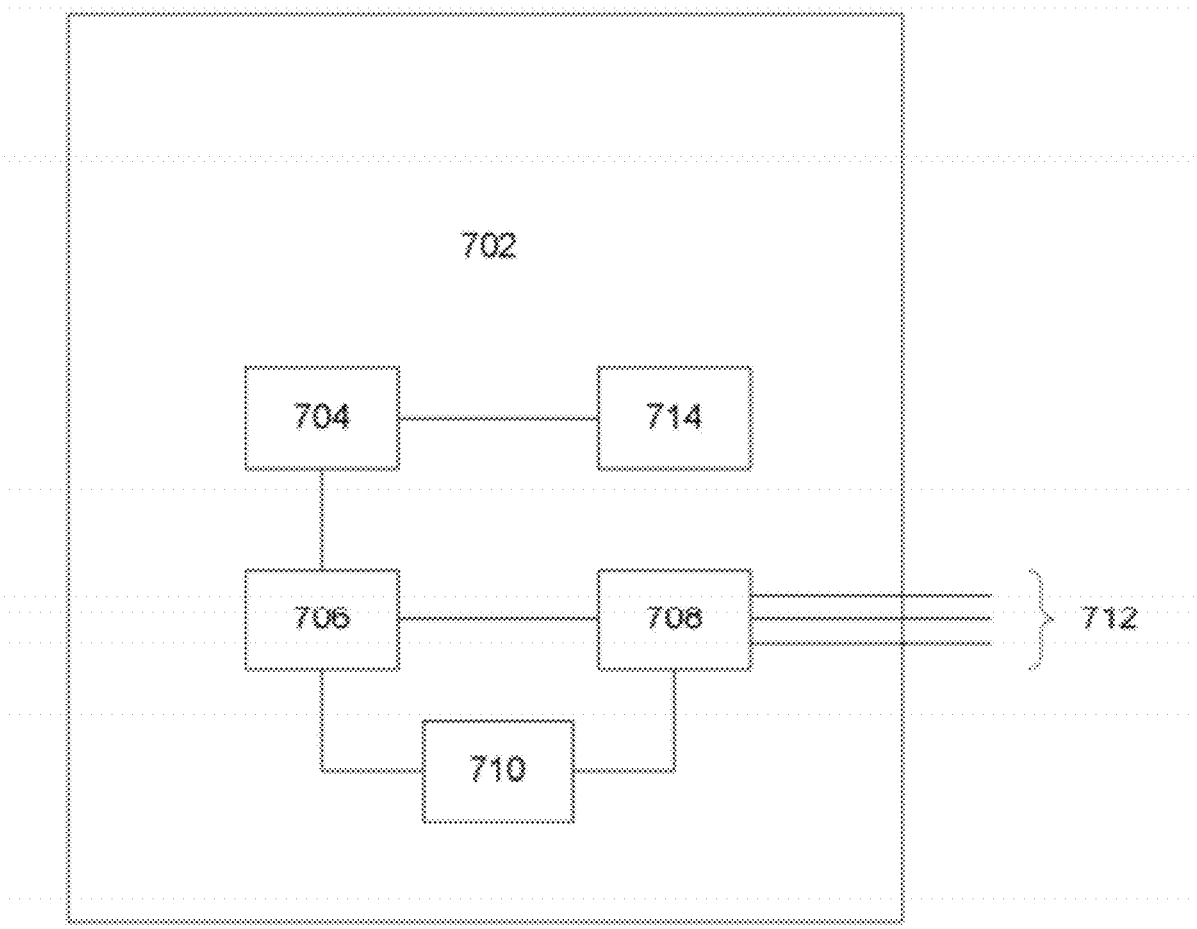
FIG. 7 shows one embodiment of a delivery mechanism that may be used in a voice message delivery system according to the present invention.

FIG. 7 shows one embodiment of a delivery mechanism 702, which may be used as either a system delivery mechanism 612 or a client delivery mechanism 614. Delivery mechanism 702 receives instructions from a dispatcher (from system dispatcher 606 in the case of a system delivery mechanism 612 and from public dispatcher 608 in the case of a client delivery mechanism 614). From the instructions received, a message assembly module 704 creates a voice message as explained further below. As discussed below, in one embodiment, the instructions are in the form of an XML script, and message assembly module 704 includes software for processing the XML script.

The voice message and telephone number are passed to an API interface 706, which then uses telephony hardware 708 to access a telephone line 712 and call the indicated number. (It will be apparent that telephone lines 712 will be telephone lines 510 where delivery mechanism 702 is a system delivery mechanism 612, and telephone lines 508 where it is a client delivery mechanism 614.)

In some embodiments, it is desirable for the voice message to include prompts asking the recipient to respond either by voice or by pushing keys on their telephone; the system may then record such responses or take further action based upon the responses. In this event, optional interactive voice response (IVR) module 710 allows delivery mechanism 702 to make such a recording or call another script to take the appropriate action. In addition, as discussed below, a message or some portion thereof may be stored in local memory 714, which may be a cache memory or a permanent memory.

Referring again to FIG. 6, when a client delivery mechanism 614 at a school district 504 polls the hosted system 506 indicating availability to make one or more calls, if one or more voice messages that are intended for households in the district have not been delivered and are deemed appropriate for the client delivery mechanism 614 to deliver, the hosted system 506 sends instructions to the client delivery mechanism 614 to make one or more telephone calls and deliver a message for each call. Once the calls are made, client delivery mechanism 614 sends verification to the public dispatcher 608 of the results of each call. The results of the calls, including whether the delivery of each message was successful or unsuccessful, are then passed to logic 604 and recorded in database 602.

If client delivery mechanism 614 remains available, it again polls hosted system 506 and, if there are further messages waiting to be sent, instructions are sent for additional calls to be de and messages to be delivered. In the event delivery of a particular message was unsuccessful and client delivery mechanism 614 again polls hosted system 506, hosted system 506 may immediately send subsequent instructions to client delivery mechanism 614 to try to deliver the message again, at the same telephone number or an alternative telephone number if one is available. Alternatively, the unsuccessful message may remain in a queue of messages awaiting delivery and an attempt made to deliver it at a later time.

In this way, logic 604 at hosted system 506 is able to keep track of which messages have been delivered and which are still awaiting delivery. If there are numerous messages to be delivered, perhaps thousands or tens of thousands depending upon the number and size of school districts 504 supported, hosted system 506 has an accurate record of messages that have been delivered by school districts 504 and which messages for which delivery has either not been attempted or has been unsuccessful.

Logic 604 will similarly keep track of messages for which delivery has been attempted by hosted system 506, and these results are also recorded in database 602. Thus, it is possible to track every request for delivery of a message made by any school 502 or school district 504. Such a system is thus more resistant to a variety of problems, such as failing to send messages or losing track of which messages have been sent in the event of a power loss, since there is now a continuous record of the status of all voice messages.

As above, one issue with prior art systems is where the voice messages or their components are created, because the transmission of audio files may require significant bandwidth, as well as the necessity of appropriate software for their preparation. It may also be desirable that all of the messages from a particular school or district be uniform in some respects. In one embodiment of the present invention the voice messages or the components thereof are created by hosted system 506, thus reducing the bandwidth necessary for transmitting the requests from the schools 502 or school districts 504. To the extent uniformity is desired, this also insures that the messages are consistent and that the same messages, other than any desired personalization, are received by all of the intended recipients.

A requested message may range from a general one to a very specific one. For example, a request might be made that all households of students in a particular school 502 or school district 504 receive a particular message of interest to all parents and/or students, such as the closing of as school due to snow or fire or some other emergency, a fundraising event, or any other desired news or activity. If a message is delivered to the households of all of the students in a district, and thus includes households from multiple schools, in some cases it may be desirable to include a preamble for the households of each school, such as "This is as message from Washington High School," or "This is Principal Skinner of Springfield Elementary School."

Alternatively, a request from a school 502 or school district 504 might ask that a message be sent to a particular group of households, such as the parents of the senior class of a high school informing them of an event for the class, or the members of a particular team or club regarding a game or event. Finally, a request might ask that a very specific message be delivered to a single household. For example, a school 502 might request that a message be sent regarding an absent student, stating that: "This is Washington High School; our child, John Doe, was absent from school today. Please call the attendance office to provide an explanation for this absence," or some similar request for a response to an absence.

To accomplish this, referring back to FIG. 6, in one embodiment hosted system 506 contains a database 602 as above, as well as one or more TTS software modules 618. In general, a school 502 or school district 504 will send a request for delivery of a message to hosted system 506 by entering or otherwise selecting the text of the message that is to be sent as well as the telephone number or some other identifier of the household to which the message is to be delivered. Alternatively, in some instances a prerecorded voice message and/or segments of messages may be recorded by a school 502 or school district 504 and stored in database 602.

The entered text may be typed in and sent for example in an email, or in some other format. In one embodiment, software on a computer at the school 502 or school district 504 presents a user with a graphical user interface (GUI) which indicates the information needed to prepare the request and provides fields for entering that information. In some embodiments, some portions of the information may be entered by the use of appropriate pull-down menus.

Where a single voice message is intended for a number of recipients without personalization, the text may be entered in a single string. Where personalization or other customization is or may be required, the message is typically entered in two or more text strings, with one or more personalized portions entered into separate fields from any standard portions. TTS module 618 is used to render the entered text into a spoken version of the message based upon the text entered by the school 502 or school district 504 that requests the message.

Each requested message or portion thereof, whether prerecorded audio or text string to be used in the text to speech conversion, is then stored in database 602 and given a Content ID, which is a pointer to the location of that audio file or text file in database 602. The audio file(s) resulting from the text to speech conversion are also stored in a file system cache of the TTS module 618, replacing the oldest cached files when the cache is full. Where a message a general one expected to go to a number of recipients without any personalization, it may be stored as a single file. Where a message is to be personalized, as above it will typically use more than one portion, with standard portions separated by the intended personalization, in which case the portions may be separately stored.

Thus, for example, in the case of the absence notification described above, part of the message is uniform and part will typically be personalized to the student in question. Since it is most desirable to have the message contain the name of the absent student, a single recording is not appropriate for all recipients. Instead, one portion of the message may be the first part of the message, "This is Washington High School; your child" and another portion of the message the remaining standard, such as "was absent from school today. Please call the attendance office to provide an explanation for this absence," since these portions do not change but are uniform in all absence messages.

The personalized portion of the message, the name portions, "John" and "Doe," will typically be entered as a separate text string or identifier, converted to speech by TTS module 618, and stored separately in the cache of TTS module 618. The standard portions of the message may either be prerecorded and stored in database 602, or may also be entered as text and converted to speech by TTS module 618.

Logic 604 sends instructions to system dispatcher 606 or public dispatcher 608 as determined above indicating the message to be delivered and the telephone number to which it is to be delivered. The instructions include one or more pointers or links to the locations where the message or the portions thereof are stored. In the case of a message that has been stored as a single file, such as a general message that is not personalized, only one pointer is needed. In the case where the message, or portion thereof, is to be rendered using text-to-speech, the actual text of the message is included in the instructions. Where the message is to contain several portions, such as the personalized absence message above, there will typically be several pointers or text strings, one for each portion. The pointers and text are typically in the order in which the portions are to be played in the message so that retrieving the indicated portions and concatenating them will result in the desired message.

The selected dispatcher will then pass the instructions to an available delivery mechanism (a system delivery mechanism 612 in the case of system dispatcher 606, or a client delivery mechanism 614 in the case of public dispatcher 608), which in turn will download the indicated audio file or files and, in the case of multiple files, concatenate them in the order indicated by the instructions to create a single audio file. In the case of TTS portions of the message, delivery mechanism 702 (either a system delivery mechanism 612 or a client delivery mechanism 614) will first check its local cache 714 for a rendered version of the text. If local cache 714 does not contain a rendered version of the text, the delivery mechanism will check with TTS module 618 to see if a cached version of the rendered message exists in the local cache of TTS module 618. If the rendered version cannot be located, the delivery mechanism will request TTS module 618 to render the text into an audio file and download it to the delivery mechanism. The delivery mechanism then dials the indicated telephone number and, if the call is answered, plays the audio file and thus delivers the requested message.

In some embodiments both system delivery mechanism 612 and client delivery mechanism 614 may, as described herein, contain a local cache memory or permanent memory 714, in which the audio files downloaded from hosted system 506 may be stored. As desired, and depending upon the size of local memory 714, some or all of the downloaded audio files may be permanently cached, or alternatively those most recently downloaded may be cached temporarily and replaced as additional audio files are subsequently downloaded.

In one embodiment, the instructions are in the form of an XML script. XML is a well known general purpose specification for creating custom markup languages, and one of skill in the art will be able to create a suitable version to write instructions to deliver messages of the type described herein. It will be apparent that a benefit of using XML scripts to transmit instructions in connection with the local memory 714 in client delivery mechanism 614 is that if a newly received XML script contains a pointer to an audio file that has already been downloaded from hosted system 506 and is stored or cached locally in memory 714, it is not necessary to download, the file again. In the case of a system delivery mechanism 612, use of a cache minimizes calls to database 602 and the inherent latency of memory access.

In the case of a single uniform message being sent to more than one recipient, it is thus not necessary to download the audio file more than once in such cases. Even in the case of a personalized message such as an absence message, if there are other absentees and it is desired to send each the same message except for the personalization it will only be necessary to download the personalized portion, i.e., the synthesized student name, for each such subsequent message since the standard voice portions of the message will have already been downloaded for the first absence message and will thus already be present locally and available for use in subsequent absence messages.

Thus, when a client delivery mechanism 614 prepares a message and a field in the XML script contains a pointer to an audio file stored in the database 602 of hosted system 506, the client delivery mechanism 614 will first check its local memory 714 to see if that file is already present locally. If so, the local copy will be accessed. If the indicated file is not present locally, client delivery mechanism 614 will obtain a copy of the audio file from database 602 in hosted system 506. If the XML script contains pointer references to multiple audio files the process above will be repeated until all audio files have been downloaded to the local memory 714 of client delivery mechanism 614. If the XML file contains text portions of the message that need to be rendered into audio files, the message assembly module 704 will first check its local cache 714 for a rendered version of the text. If no locally cached version of the rendered text exists, the message assembly module 704 will check with TTS module 618 of hosted system 506 to see if a cached version of the rendered message exists in the local cache of TTS module 618. If no rendered version can be found, the client delivery mechanism 614 will request TTS module 618 to render the text into an audio file and download it to the client delivery mechanism.

An XML script to deliver an absence message to telephone number 831-588-4321 might look like:

```
<voice>
    <dial callerid="8315884321">8315884321</dial>
        <message name="absence call">
            <audio cmid="101" />
            < tts>John></tts >
            < tts>Doe></tts >
            <audio cmid="102" />
            <hangup />
        </message>
</voice>
```

"Message name" indicates that it is the absence message that is to be played. In this instance, the initial and final portions of the message have been prerecorded. Each "audio cmid" field includes a content ID, which as stated above is a pointer to the location in database 602 where a prerecorded portion of the message has been stored. Thus, audio cmid="101" is the content ID indicating the location in database 602 where the audio file containing "This is Washington High School; your child" is stored, and audio cmid="102" is the content ID indicating the location of the portion "was absent from school today. Please call the attendance office to provide an explanation for this absence," The code <tts>John></tts> is a request processed by the message assembly module 704 to retrieve the audio file for the name "John" by checking the local cache 714 and the cache of TTS module 618 and then requesting that the text be rendered if necessary as described above. Similarly <tts>Doe</tts> is a request processed by the message assembly module to retrieve the audio file for the name "Doe." Thus, the script represents instructions to retrieve the two audio files, locate or request the rendered name, dial the telephone number 831-588-4321, and, if the call is answered, play the retrieved portions of the message in the indicated order, and then disconnect the call. Other variations of such a script will be apparent to one of skill in the art.

XML scripts are significantly smaller files than audio files. Instructions for a one minute telephone call may for example require a 1 kilobyte XML script, as compared to 1 megabyte or more of data for an audio file for a one minute call. In some prior art systems, a separate audio file might be recorded for each absent student. In the case of multiple absentees, having to download each such file might result in the necessity of significant bandwidth for transmission as described herein. In the present invention, by contrast, since the message is divided into portions, the portions that will be the same in each message are only downloaded once, and only the personalized portions downloaded separately for each message.

Using the approach of the present invention thus consumes significantly less bandwidth than downloading the entire audio message for each request by avoiding the need to download multiple copies of the same message or the same portions of multiple messages, limits the number of connections necessary between the school districts 504 and hosted system 506, and results in a significant improvement in the quality of service.

Figure 8:
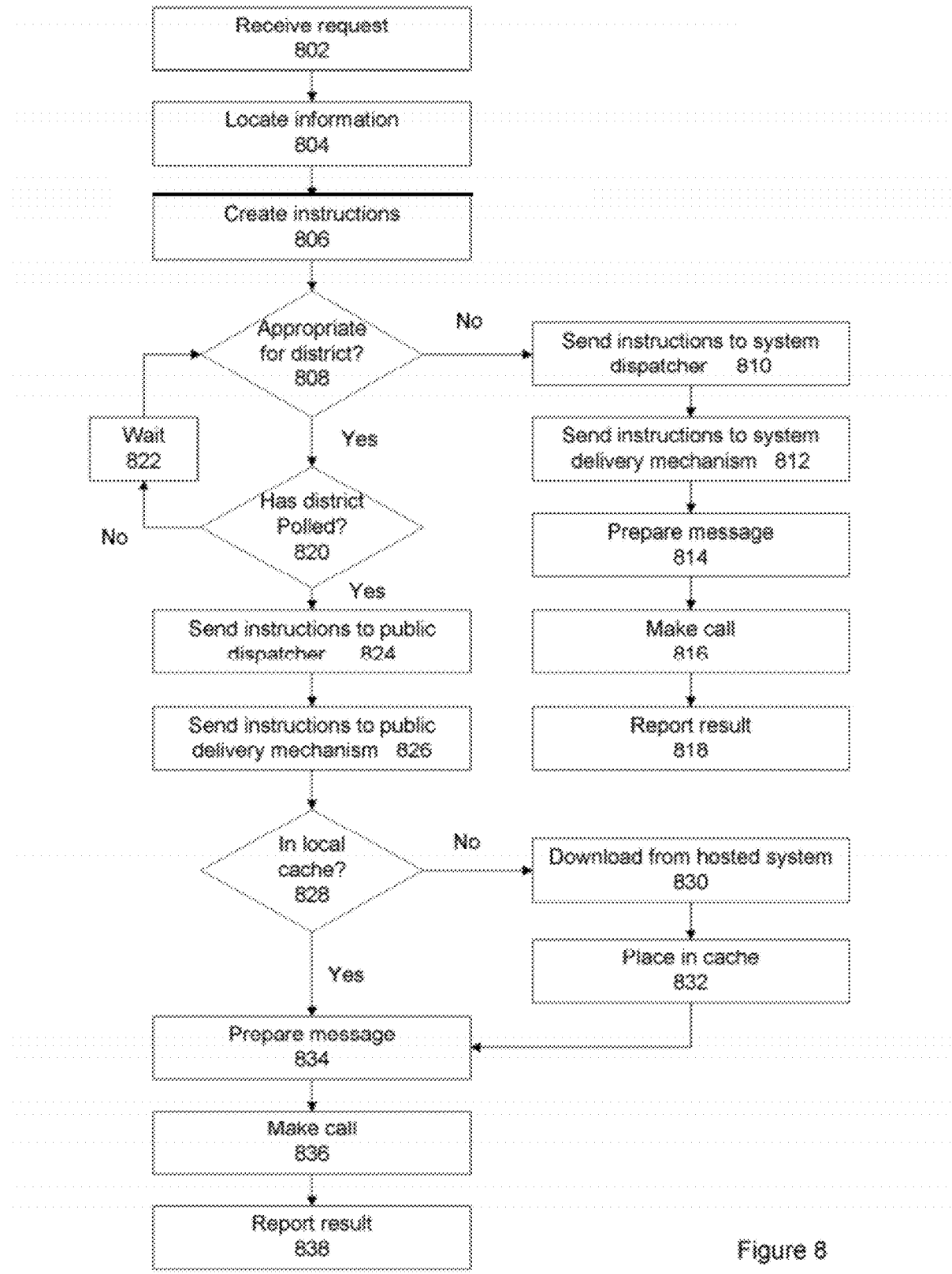
FIG. 8 is a flowchart, of one embodiment of a method of delivering messages according to the present invention.

Further details of the invention will be explained in the context of FIG. 8, which is a flowchart of one embodiment of a method according to the present invention. At step 802, a school or school district sends a request to a hosted system indicating a message to be delivered and one or more telephone numbers to which the message is to be delivered. A request that a general message be delivered will typically indicate the message to be delivered and the recipients. A request that a personalized message be sent will similarly indicate the desired message (for example, an absence message) and the intended recipient(s), as well as information about the desired personalization, such as the student's name or ID number.

As above, in some embodiments, a computer at the requesting school or school district is equipped with software that provides a GUI by which a user may generate a message request through the use of pull down menus, check boxes, text boxes in which alphanumeric text may be entered, or other techniques known in the art. In other embodiments, a user may enter a request via a telephone, with the hosted system providing prompts to the user advising the user which keys on the telephone keypad to push in order to indicate a message and recipient(s).

Upon receiving the request, at step 804 the hosted system will look, for any information in its database that is necessary to prepare and deliver the message. For example, if the request indicates that all 9$^{th}$ grade students at Washington High School should receive the indicated message, the hosted system will look to see if the telephone numbers of households of those students are in its database, in which case the data will be retrieved. The hosted system will then locate the text that is to be synthesized for each portion of the indicated message, access a TTS module to synthesize a voice recording of that portion of the message, and store the synthesized speech in a cache memory.

Next, instructions are created at step 806 indicating the message to be delivered. As above, in one embodiment, the instructions are in the form of an XML script, with pointers to the audio portions of the message and the message text of any portions of the message that are to be rendered by the TTS module in the order in which they are to be played, and the telephone number to be called.

For each message, at step 808 the hosted system determines whether the message should be delivered by the hosted system itself or by the district 504 in which the number is located. If it is determined that the message should be delivered by the hosted system, at step 810 the instructions are sent to a system dispatcher, which forwards them to an available system delivery mechanism at step 812.

The receiving system delivery mechanism prepares the message at step 814. If the message is a single audio file, it is either retrieved from the local cache of the delivery mechanism or from the database. If the message is to contain personalized portions, the synthesized name or other personalization is either retrieved from the local cache of the delivery mechanism or the cache of the TTS module, and the portions are placed in order. The pointers in the XML script instructions indicate where the audio message or the audio portions of the personalized message may be found in the database.

The telephone number to be called is then used to initiate a telephone call at step 816, and, if the call is answered, the audio file is played, delivering the message. The result, whether successful or not, is reported to the hosted system at step 818, which records the result in the database.

On the other hand, if it is determined that the message should be delivered by the school district that made the request or in which the requesting school is located, at step 820 the hosted system checks to see if it has been polled by a client delivery mechanism at the school district. If the client delivery mechanism has not polled, the hosted system will wait for some period of time (step 822), and then check again to see if the client delivery mechanism has polled. As above, instructions may be sent that more than one message is to be delivered by the client delivery mechanism; this improves efficiency in the communication between the hosted system and the client delivery mechanism.

If in step 820 the hosted system finds that it has been polled by the client, delivery mechanism at the school district, and thus that the client delivery mechanism has indicated that it is able to deliver a message, the hosted system forwards the instructions to a public dispatcher at step 824, which in turn sends them to the client delivery mechanism at step 826.

At step 828, the client delivery mechanism checks its local memory to see if the message indicated in the instructions or any of the portions thereof are already present. If the message or any portions are available locally, they are accessed locally. If the message or any portions are not available locally, the necessary audio file(s) are downloaded from the hosted system at step 830 and placed in the local memory at step 832, discarding the oldest local file if the local memory is full.

Once the message or all portions have been determined to be available locally or downloaded, the client delivery mechanism prepares the message at step 834 by accessing the message, or the portions of the message in the intended order. The call is made to the telephone number contained in the instructions at step 836 and again, if the call is answered, the message is played. The result of the call (or results of multiple calls) is reported back to the hosted system at step 838 and recorded in the database. Once the call has been made and the result reported, the client delivery mechanism will check to see if it is ready to accept instructions to make additional calls, and, if so, will again poll the hosted system.

The hosted system, such as hosted system 506, will typically have a large number of telephone lines so that it will be able to deliver large numbers of messages in a short period of time. While the use of the telephone lines 508 of the school districts 504 reduces the burden on the hosted system and the cost of delivering messages, each school district 504 remains able to independently configure and allocate the telephone lines 508 it needs for its normal operations and to determine how many of those telephone lines are made available to the school district 504 for voice calls. The number of messages sent to the school district 504 for delivery will typically be a function of the number of lines that are available for delivery of voice messages, which can even be dynamically allocated at different times of day or days of the week, e.g., more lines may be made available at night or on weekends when a school district is not open. School districts 504 are thus able to maintain control of their own resources and budgets.

Further, in some prior art systems, TTS capability is required at school districts 504, which typically requires a license for TTS software. By contrast, in a system of the present invention, licenses are needed only for the TTS modules 618 in hosted system 506. This also helps to reduce the cost as the TTS software license is now amortized across all participating schools and school districts.

The invention has been explained above with reference to several embodiments. Other embodiments will be apparent to those skilled in the art in light of this disclosure. The present invention may readily be implemented using configurations other than those described in the embodiments above, or in conjunction with systems other than the embodiments described above.

For example, while reference herein has been made generically to telephone lines, it should be noted that any type of connection over which a voice telephone call may be made is within the scope of the present invention. Thus, calls made directly over the regular public, switched telephone network (PSTN), a T1 line, PRI (primary rate interface), through a PBX, or over the internet via a voice over IP (VOIP) protocol or Java telephone application programming interface (JTAPI) are all to be considered telephone calls as used herein. Any type of IVR is similarly within the scope of the present invention.

In addition, while the embodiments discussed herein show particular operations occurring in certain modules, some operation may be easily moved from one module to another, or some modules combined, with no loss in functionality. All such variations are considered to be within the scope of the present invention.

It should also be appreciated that the present invention can be implemented in numerous ways, including as a process, an apparatus, or a system. The method of FIG. 8 or alternative methods embodying the present invention may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc., or a computer network wherein the program instructions are sent over optical or electronic communication links. It should be noted that the order of the steps of the methods described herein may be altered and still be within the scope of the invention.

These and other variations upon the embodiments are intended to be covered by the present invention, which is limited only by the appended claims.

What is claimed is:

1. A method for calling a telephone number to deliver a voice message on behalf of one of a plurality of requestors organized into groups, each group having a group delivery mechanism with the ability to make telephone calls and play voice messages, comprising:
   receiving at a central system a request from a requestor to deliver a voice message to a designated telephone number, the central system having a central delivery mechanism with the ability to make telephone calls and play voice messages;
   determining whether the message should be delivered by the central delivery mechanism or by the group delivery mechanism of the group to which the requestor belongs;
   transmitting instructions to the central delivery mechanism if it is determined that the message should be delivered by the central delivery mechanism, or to the group delivery mechanism if it is determined that the message should be delivered by the group delivery mechanism, the instructions indicating the voice message to be delivered and the telephone number to which it is to be delivered; and calling the designated telephone number from the delivery mechanism that receives the instructions and playing the indicated voice message if the call is answered.

2. The method of claim 1 wherein receiving a request further comprises receiving a text version of the voice message, and further comprising synthesizing the text version into the voice message.

3. The method of claim 2 wherein receiving a request further comprises receiving a request to personalize the voice message for a particular recipient.

4. The method of claim 3 wherein receiving a text version of the indicated voice message further comprises receiving a request that one portion of the voice message be a uniform portion and another portion of the voice message be personalized to a particular recipient, and synthesizing the text version further comprises synthesizing a standard portion of the voice message and a personalized portion of the voice message.

5. The method of claim 4 further comprising storing the uniform portion of the voice message and the personalized portion of the voice message in a memory at the central system.

6. The method of claim 5 wherein transmitting instructions further comprises transmitting the instructions in XML format.

7. The method of claim 6 wherein the instructions comprise pointers to the locations in the central system memory of the uniform portion of the voice message and the text necessary to retrieve or render the personalized portion of the voice message.

8. The method of claim 7 further comprising downloading the portions of the message to the delivery mechanism from the locations in the central system memory indicated by the pointers.

9. The method of claim 8 further comprising storing the downloaded portions of the message in a memory local to the delivery mechanism.

10. The method of claim 1 wherein the groups are school districts, and the requesters are schools and the school districts to which the schools belong.

11. The method of claim 1 wherein determining whether to initiate a call to the designated telephone number from the central delivery mechanism or the group delivery mechanism further comprises determining if the group delivery mechanism is available to send the message.

12. The method of claim 1 wherein determining whether to initiate a call to the designated telephone number from the central delivery mechanism or the group delivery mechanism further comprises determining if the message is urgent.

13. A hosted system for delivering a voice message on behalf of one of a plurality of requestors organized into groups, each group having the ability to make telephone calls and play voice messages, comprising:

a central delivery delivery mechanism having the ability to execute instructions to make a telephone call and play a voice message; and a processor configured to:

receive from a requestor a request to deliver a voice message to a designated telephone number;

create instructions indicating the voice message to be delivered and the telephone number to be called;

determine whether the message should be delivered by the central delivery mechanism or by the group to which the requestor belongs; and transmit the instructions to the central delivery mechanism if it is determined that the message should be delivered by the central delivery mechanism, and to the group if is determined that the message should be delivered by the group.

14. The hosted system of claim 13, further comprising:

a text to speech module for creating an audio file containing speech from text contained in the request; and a memory for storing the audio file.

15. The hosted system of claim 13, wherein the processor is further configured to create the instructions as an XML script.

16. The hosted system of claim 13, wherein the processor is further configured to:

receive a signal from the group indicating that the group is able to deliver a message; and determine whether to send the instructions to the central delivery mechanism or to the group to which the requester belongs based in part upon the signal.

17. A system for delivering voice messages on behalf of a plurality of requestors organized into groups, comprising:

a server containing:

a central delivery mechanism including:

a telephone module for making telephone calls; and a voice rendering module for executing instructions to prepare a voice message and for playing the voice message; and a processor configured to:

receive from a requestor a request to deliver a voice message to a designated telephone number;

create instructions indicating the voice message to be delivered and the telephone number to be called;

determine whether the message should be delivered by the central delivery mechanism or by the group to which the requestor belongs; and transmit the instructions to the central delivery mechanism if it is determined that the message should be delivered, by the central delivery mechanism, and to the group if it is determined that the message should be delivered by the group to which the sender belongs; and a group delivery mechanism at the group including:

a telephone module for making telephone calls; and a voice rendering module for executing the instructions, preparing a voice message and playing the voice message.

18. A method for calling telephone numbers to deliver voice messages on behalf of a plurality of requestors organized into groups, each group having a group delivery mechanism with the ability to make telephone calls and play voice messages, comprising:

receiving at a central system a plurality of requests from senders to deliver indicated voice messages to designated telephone numbers, the central system having a central delivery mechanism with the ability to make telephone calls;

selecting a first plurality of messages to be delivered by the central delivery mechanism and a second plurality of messages to be delivered by the group delivery mechanism of a group for requestors within that group;

transmitting a first plurality of instructions to the central delivery mechanism to deliver the first plurality of calls, and a second plurality of instructions to the group delivery mechanism to deliver the second plurality of calls, each instruction indicating a voice message to be delivered and the telephone number to which it is to be delivered;

calling each number in the first plurality of instructions from the central delivery mechanism and playing the message indicated for that number if the call is answered; and calling each number in the second plurality of instructions from the group delivery mechanism and playing the message indicated for that number if the call is answered.

* * * * *